United States Patent [19]
Yates

[11] Patent Number: 6,112,618
[45] Date of Patent: Sep. 5, 2000

[54] BICYCLE HANDGRIP

[76] Inventor: Paul M. Yates, 5814 Briar Tree Dr., LaCanada, Calif. 91011

[21] Appl. No.: 09/030,366

[22] Filed: Feb. 25, 1998

[51] Int. Cl.$^7$ .................................................. B62K 21/26
[52] U.S. Cl. ..................................... 74/551.9; 16/DIG. 12
[58] Field of Search .................... 74/551.9; 16/DIG. 12, 16/DIG. 19

[56] References Cited

U.S. PATENT DOCUMENTS

| | | | |
|---|---|---|---|
| 4,416,166 | 11/1983 | Jannard et al. | 74/551.9 |
| 4,535,649 | 8/1985 | Stahel | 74/551.9 |
| 4,852,423 | 8/1989 | Mikami et al. | 74/551.9 |
| 5,290,063 | 3/1994 | Lenhart | 74/551.9 X |

FOREIGN PATENT DOCUMENTS

| | | | |
|---|---|---|---|
| 441974 | 8/1912 | France | 74/551.9 |
| 411862 | 4/1925 | Germany | 74/551.9 |
| 85686 | 2/1936 | Sweden | 74/551.9 |
| 19995 | of 1903 | United Kingdom | 74/551.9 |
| 168109 | 8/1921 | United Kingdom | 74/551.9 |

*Primary Examiner*—Mary Ann Battista
*Attorney, Agent, or Firm*—Walter A. Hackler

[57] ABSTRACT

A handgrip is provided suitable for installation over, for example, a handlebar of a bicycle. The handgrip generally includes a cap having an inside depending sidewall and an outside depending sidewall defining a circumferential gap therebetween, and an integrally molded hollow tubular plastic body surrounding the inside depending sidewall, extending therefrom to form a sleeve and filling the circumferential gap. The sleeve material may extend into and fill one or several voids defined in the cap such that an end surface of the cap defines a colorful, distinguishable pattern, logo or the like. The handgrip may include a hard inner sleeve including a plurality of longitudinal ribs for enhancing grip.

5 Claims, 2 Drawing Sheets

BICYCLE HANDGRIP

The present invention relates to a handgrip for a bicycle or the like, and more specifically relates to a scuff resistant bicycle handgrip and method of manufacturing same.

Modern bicycle design includes handgrips fitted over handlebars of a bicycle, said handgrips typically including textured plastic surfaces for facilitating gripping of the handlebars and preventing slipping of hands therefrom. During the process of assembling a bicycle, handgrips are fastened to the metal handlebars by slipping a hollow body of the grip over the handlebar, plugging the end of the handlebar with a relatively hard plastic endcap and rotating a screw on the endcap to cause expansion of a interior body portion of the endcap against the metal handlebar.

Conventional bicycle handgrips are therefor comprised of at least two entirely separate elements, the endcap with fastening mechanism and the hollow grip body. Although the grip body may be decorative by means of creative texturing, the endcap typically is not ornamental. This may be due to the fact that a substantial visible surface area of the end cap must include access to a screw head or other fastening mechanism.

There is a present need for an easier to install, less expensive to manufacture handgrip and process for making same, without sacrificing visual appeal or effectiveness of the handgrip.

SUMMARY OF THE INVENTION

Accordingly, the present invention provides a decorative, easy to install handgrip for a bicycle or the like, as well as a simple, inexpensive method of manufacturing same. Moreover, the present invention eliminates the need for screws or other fastening mechanisms to secure the handgrip to a bicycle handlebar or other shaft.

The handgrip is generally comprised of a cap which may have an outside depending sidewall and an inside depending sidewall defining a circumferential gap therebetween. If depending sidewalls are utilized, preferably the outside depending sidewall is shorter than the inside depending sidewall. The handgrip further comprises an integrally molded hollow tubular plastic body surrounding the inside depending sidewall of the cap, extending therefrom to form a sleeve, and filling the circumferential gap. The tubular plastic body preferably has an outside diameter approximately equal to an outside diameter of said outside depending sidewall. The tubular plastic body has an inside diameter sized for sleeving over a shaft, such as, for example, a bicycle handlebar or a golf club shaft.

More particularly, the cap of the handgrip may be formed of a relatively hard material in comparison the tubular plastic body. The tubular plastic body is preferably comprised of a relatively soft plastic or rubber to provide sufficient friction and comfort between a cyclist's hand and the handgrip. The cap, being of a relatively harder material, provides a protective element by preventing the softer tubular plastic body from scuffing or other damage.

Importantly, the cap may include means for defining a void having a selected cross section in an end of said cap. In this embodiment, the tubular plastic body extends into and fills the void. The cap material and the tubular plastic body material may be different colors to provide a distinguishable pattern on the cap end defined by the filled void and the surrounding cap material. The void may thus define a logo, lettering or the like for decorative and identification purposes. Furthermore, by the void being filled with the tubular plastic body material, the cap and tubular plastic body are securely anchored together without need for adhesives and will resist separation.

In another embodiment, the handgrip may include a relatively hard tubular inner sleeve for facilitating sleeving of the handgrip onto a shaft by resisting bunching caused by friction between the handgrip and shaft. A relatively soft tubular plastic cover may be molded over the harder inner sleeve to provide appropriate comfort and grip to a user. Again, voids may be defined in the cap and the hard inner sleeve material may fill the voids providing a contrasting logo or decoration on an end surface of the cap. For enhancing the decorative appearance of the handgrip, different materials of different colors may be used for the soft tubular plastic cover, the cap and the hard inner sleeve.

Another feature of the present invention includes a plurality of spaced apartl ribs or bumps which form a part of the hard inner sleeve for enhancing grip on the handgrip, particularly during manual twisting against the handgrip.

A method of making a handgrip with a decorative end cap in accordance with the present invention is also provided. The method may include the steps of providing a cap which may have an inside depending sidewall, a spaced apart outside depending sidewall with a circumferential gap therebetween and a void having a selected cross section in an end of said cap. Next, the method includes the steps of inserting a mandril inside the inside depending sidewall and molding a plastic material over the mandril and filling the void in the cap to form a sleeve extending from the cap end and finally removing the mandril from said cap and sleeve. The step of molding may include the step of molding the plastic material with a thickness filling the circumferential gap. In addition, the step of molding may include molding the plastic material with an outside diameter equal to an outside diameter of the outside depending sidewall.

Alternatively, the step of molding may include molding the plastic equal to an outside diameter of the inside depending sidewall and further compromising the step of molding a softer plastic over the sleeve which fills the circumferential gap and has an outside diameter approximately equal to a diameter of the outside depending sidewall.

BRIEF DESCRIPTION OF THE DRAWINGS

The features and advantages of the present invention will be more readily understood with reference to the following detailed description when considered in conjunction with the accompanying drawings in which.

DETAILED DESCRIPTION

Figure 1:
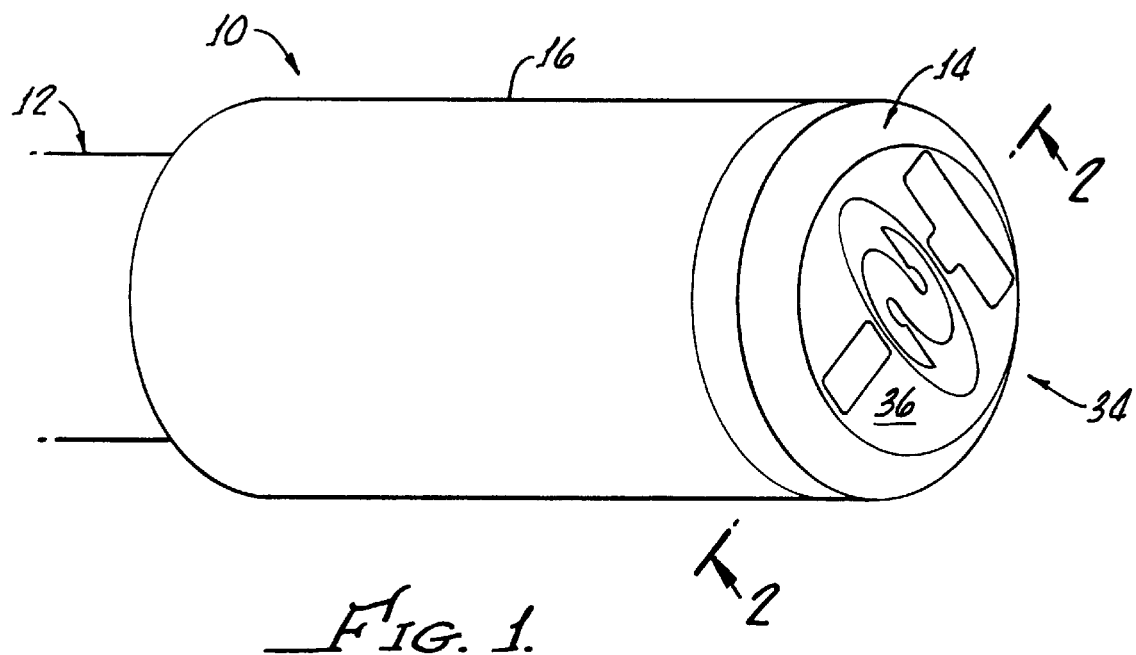
FIG. 1 shows a perspective view of a bicycle handgrip, in accordance with the present invention, having a scuff resistant, decorative cap and a relatively soft outer sleeve.
Figure 2:
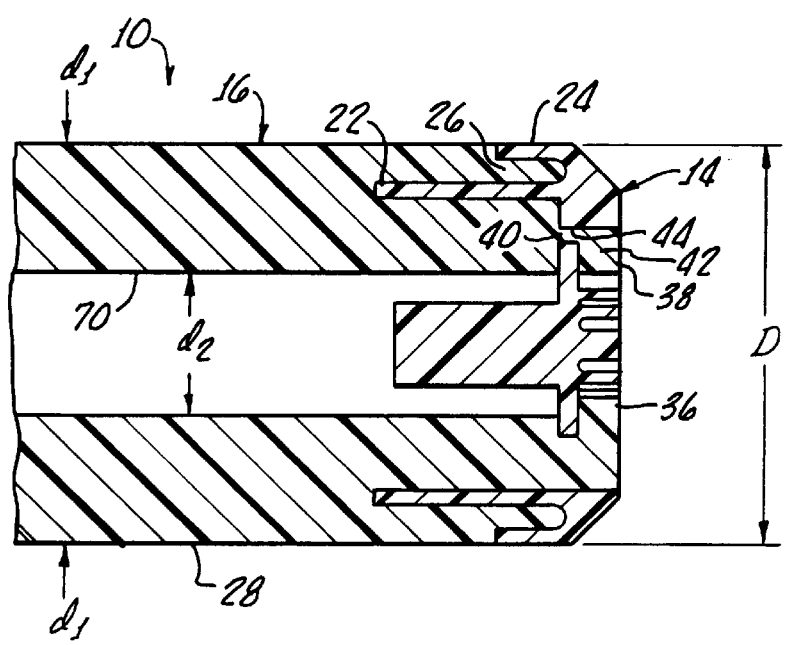
FIG. 2 shows a cross sectional view of the handgrip shown in FIG. 1, taken along line 2—2, showing the cap as including inside and outside depending sidewalls, voids defined in the cap and filled with the relatively soft outer sleeve material.

Turning now to FIG. 1, a handgrip 10 in accordance with the present invention is shown connected to a standard bicycle handlebar shaft 12. The handgrip 10 generally includes a cap 14 and an integrally molded hollow tubular body 16. Turning now as well to FIG. 2, the cap 14 may include two, spaced apart, circumferential sidewalls, particularly an inside depending sidewall 22 and an outside depending sidewall 24 defining a circumferential gap 26 therebetween. Alternatively, the depending sidewalls 22,24 may be eliminated.

The cap 14 may be made of an impact resistant, relatively hard durometer material such as plastic or metal. The tubular body 16 may be comprised of a relatively soft durometer material such as foam, rubber, soft plastic or gel, or any other moldable material which is suitable for providing sufficient friction and grip for a user of the handgrip 10.

As shown most clearly in FIG. 2, the tubular body 16 is molded such that it surrounds the inside depending sidewall 22, extending therefrom to form a sleeve 28. The body 16 may be molded with a thickness such that it fills the circumferential gap 26.

Preferably, the outside depending sidewall 24 of the cap 14 is shorter than the inside depending sidewall 22. The longer inside depending sidewall 22 enhances the strength of the handgrip 10, for example, by resisting denting of the internal shaft 12 upon impact.

In addition, the body 16 preferably has an outside diameter $d_1$ approximately equal to, or less than, an outside diameter D of the outside depending sidewall 24. The body 16 may have an inside diameter $d_2$ for sleeving over the shaft 12. It is to be appreciated that the shaft may be the shaft of a bicycle handlebar, or golf club, or any other shaft for which a handgrip would be suitable for use.

As shown, the handgrip 10 may include a decorative element 34 defined in an end or other surface 36 of the cap 14. Specifically, the decorative element 34 may be integrally molded with the tubular body 16. More specifically, and as most clearly shown in FIG. 2, at least one void 38 may be defined in the cap 14, said void 38 having a selected cross section and a selected shape. During molding of the body 16, as will be described in greater detail hereinafter, the body material 16 may extend into and fill the void 38. Preferably, the void 38 is filled with the body material 16 and may protrude from the cap 14 or be flush with the surrounding cap surface 36 as shown in FIG. 2. An outside mold (not shown) may be used for creating the flush surface, or alternatively, excess material which has extruded through the voids 38 may be removed or trimed to a desired shape by any conventional means.

For enhancing the design feature of the present invention, the cap material 14 and the body material 16 may be of different colors to provide a contrasting or otherwise distinguishable pattern on the cap surface 36 defined by the filled void 38 and surrounding cap 14. It should be appreciated that the term "pattern" as used herein, may include any chosen pattern, design, logo, lettering or the like.

In addition to providing a decorative appearance, the filled void 38 of the handgrip 10 of the present invention secures bonding without screws, adhesives or the like, between the body 16 and the cap 14 by anchoring the cap 14 to the body 16. Anchoring is particularly enhanced if the void 38 is made to be relatively narrow near an inside surface 44 of the cap 14, such as shown by void inlet 40 in FIG. 2. Thus, a wider portion 42 of the filled void 38 functions as a plug which resists separation between the integrally connected body 16 and the cap 14.

It is contemplated that the handgrip 10 in accordance with the present invention may include a bicycle handgrip as described hereinabove and lacking structure of the inside depending sidewall 22. In this case, the tubular plastic body 16 may abut the outside depending sidewall 24 and be secured to the cap 14 by means of the body material extending into a filling the voids 38 as described above.

Figure 3:
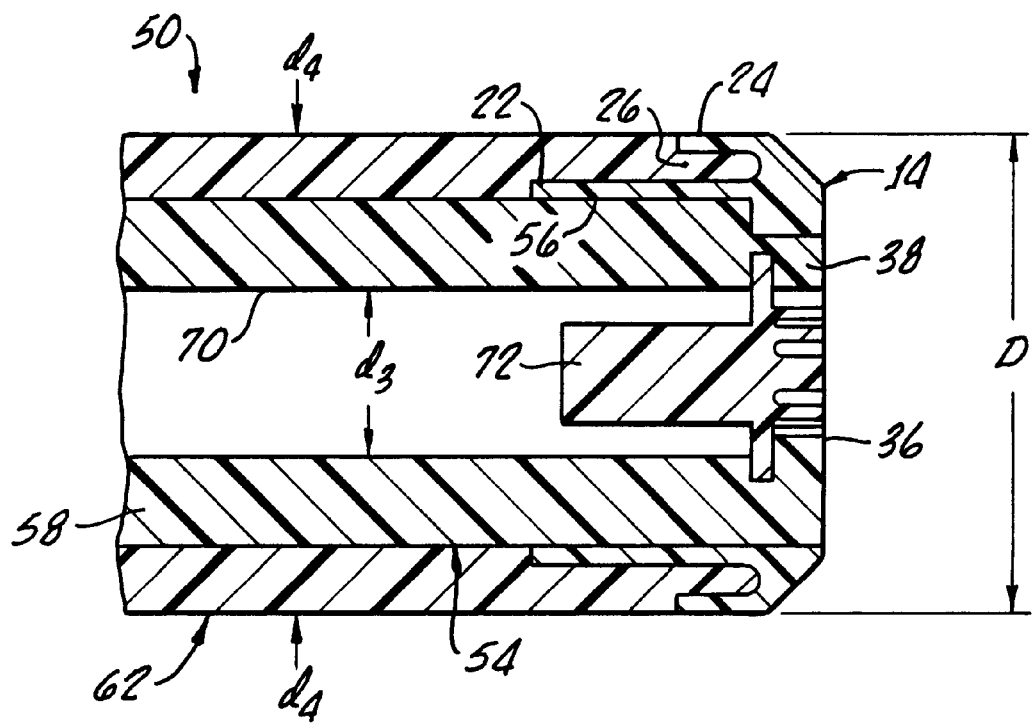
FIG. 3 shows a cross sectional view similar to that of FIG. 2, for an alternative embodiment of the handgrip in accordance with the invention, this embodiment including a relatively hard inner sleeve for facilitating sleeving onto a shaft of a bicycle handlebar, as well including as a relatively soft, molded outer cover.

Turning now to FIG. 3, an alternative embodiment 50 of the present invention is shown in a similar cross section to FIG. 2, with identical features and elements represented by identical numerals. In this embodiment, the cap 14 may be identical to the cap 14 described hereinabove and shown in FIG. 2.

Alternative to the tubular body 16 described above, the handgrip 50 may comprise an integrally molded hollow, relatively hard plastic body 54 disposed on an inside surface 56 of the inside depending sidewall 22 of the cap 14 and extending therefrom to form an inner sleeve 58, the hard plastic body 54 having an inside diameter $d_3$ sized for sleeving over the shaft 12. In addition, the handgrip 50 comprises a relatively soft tubular plastic cover 62 disposed over the body 54 and filling the circumferential gap 26, said relatively soft cover 62 having an outside diameter $d_4$ approximately equal to the outside diameter D of the outside depending sidewall 24. The soft cover 62 may be comprised of any suitable moldable material.

Since it is relatively rigid, the hard plastic body 54 will resist bunching and facilitate sleeving of the handgrip 50 onto a handlebar 12 during the installation of the handgrip 50.

If the cap 14 is provided with one or more voids 38 as described hereinabove, the hard plastic body 54 may extend into and fill the voids 38 and provide a contrasting pattern, logo or the like on the end surface 36 of the cap 14. Additionally, the voids 38 may communicate with the soft cover 62 material. In this manner the soft cover 62 material may extend into and partially fill the voids 38. Use different textures and colors of soft cover 62 material, hard plastic body 54 material and end cap 14 material enables a variety of design effects on the end cap 14 as well as textural differences in the end cap 14 pattern. The tubular body material 54 in the void 38 may be molded such that it is flush with the surrounding cap 14. The integral tubular body 54 may have a color different from said cap 14 to provide a distinguishable pattern in the cap end surface 36 defined by the filled void and surrounding cap 14.

It is to be appreciated therefor, that the finished handgrip 50 may be comprised of three different, molded materials and colors if desired, thus enhancing the potential variety of design and visual appeal of the grip 50.

Figure 4:
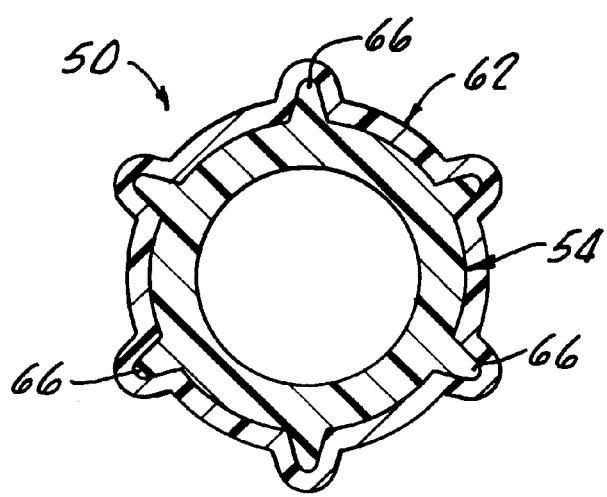
FIG. 4 shows a cross sectional view taken along line 4—4 of FIG. 3 showing an optional feature of the present invention, specifically means for enhancing grip on the handgrip during manual twisting thereon including a plurality of spaced apart ribs or bumps disposed about and integrally molded with the hard inner sleeve.

Turning now to FIG. 4, another feature of the present invention is shown in cross sectional view. More specifically, the handgrip 50 of FIG. 3 may include a plurality of spaced apart ribs, or bumps, 66 disposed about and integrally molded with the hard plastic body 54. The ribs may be longitudinal and equidistantly spaced about the handgrip 50 and may be, for example, about six in number as shown. The ribs 66 provide means for enhancing grip on the handgrip 50 during manual twisting of the palm against the grip 50. Because the ribs 66 are molded as a part of the hard inner sleeve 54, they will withstand and maintain contour even during a tight clutch against the handgrip 50 and will improve a cyclist's hold when the hands are twisting during steering of the bicycle for example. This feature is particularly advantageous for a cyclist during an extended bicycle ride when the hands of the cyclist may perspire or may be excessively weakened or fatigued. In this regard the ribs or bumps 66 may be of any suitable size with various spacing in order to improve the cyclist's hold and prevent twisting.

The soft cover 62 may be molded such that it assumes the contour of the ribs 66 or alternatively, the cover 62 may be molded flush and smooth over the hard ribs 66 such that the handgrip will appear like the handgrip 10 shown in FIG. 1.

A method of manufacturing a handgrip 10, 50 with a decorative end surface 36 is also provided by the present invention. The method may comprise the steps of providing a cap 14 as shown in the Drawings and described hereinabove, inserting a mandril 70 (shown as a broken line in FIGS. 2 and 3) inside the circular inside depending sidewall 22, and molding a plastic material over the mandril 70, and filling the at least one void 38 in the cap 14. Positioning of the mandril can be facilitated by a depending central projection 72 provided in the cap. Finally, after allowing the molded plastic material to cool or otherwise set, the mandril is removed from the cap and sleeve. The handgrip 10 may then be installed on a bicycle by sleeving the handgrip over the handlebar shaft 12.

In the embodiment shown in FIG. 2, the plastic material forms the relatively soft body 16 and is molded with a thickness sufficient to fill the circumferential gap 26. In addition, the step of molding may include molding the plastic with an outside diameter approximately equal to the outside diameter D of the outside depending sidewall 24 of the cap 14. The soft body material may be molded with a length sufficient to form a flush surface with the end surface 36 of the cap and extended to form sleeve. By providing contrasting colors of the soft body 16 and cap 14, the end surface 36 of the cap 14 can be made visually appealing and decorative.

The embodiment shown in FIG. 3 may be manufactured as described hereinabove for the embodiment 10 shown in FIG. 2 with the addition of molding the relatively hard inner body 54 as well as the soft outer cover 62.

For example, the method may include the steps of molding a hard plastic over the mandril 70 with a thickness sufficient to approximately equal to an inside diameter of the inside depending sidewall such that the hard inner body 54 is disposed on the inside surface 56 of the inside depending sidewall and fills the voids 38 for causing the decorative effect on the end surface 36. The method further includes the step of molding a softer plastic over the sleeve which fills the circumferential gap 26 and has an outside diameter approximately equal to a diameter of the outside depending sidewall 24.

It will be understood by those skilled in the art that the molding steps may be accomplished by suitable conventional molding techniques, and therefor details such as the composition of materials, handling of said materials, and cooling or setting times have been omitted for the sake of simplicity.

Although there has been hereinabove described a bicycle handgrip and a method of manufacturing same, in accordance with the present invention, for purposes of illustrating the manner in which the invention may be used to advantage, it will be appreciated that the invention is not limited thereto. Accordingly, any and all modifications, variations, or equivalent arrangements which may occur to those skilled in the art should be considered to be within the scope of the present invention as defined in the appended claims.

What is claimed is:

1. A handgrip suitable for installation over a shaft, said handgrip comprising:

a cap having an inside depending sidewall and a spaced apart outside depending sidewall with a circumferential gap therebetween, said cap including an end surface defining a void therein; and an integrally molded hollow tubular plastic body surrounding the inside depending sidewall, extending therefrom to form a sleeve and filling the circumferential gap, the tubular plastic body having an outside diameter approximately equal to an outside diameter of said outside depending sidewall and an inside diameter sized for sleeving over a shaft;

said integrally molded hollow tubular plastic body extending into and filling the cap surface void.

2. The handgrip according to claim 1 wherein said cap is formed from a relatively hard material and said tubular plastic body is formed from a relatively soft material.

3. The handgrip according to claim 2 wherein said outside depending sidewall is shorter than said inside depending sidewall.

4. The handgrip according to claim 1 wherein the cap material and the tubular body material are of different colors to provide a distinguishable pattern on the cap end defined by the filled void and surrounding cap.

5. The handgrip according to claim 4 wherein the tubular body material in the void is flush with the surrounding cap.

* * * * *